J. G. OESTREICH.
VALVE SPRING LIFTER.
APPLICATION FILED MAY 1, 1920.
1,358,871.
Patented Nov. 16, 1920.
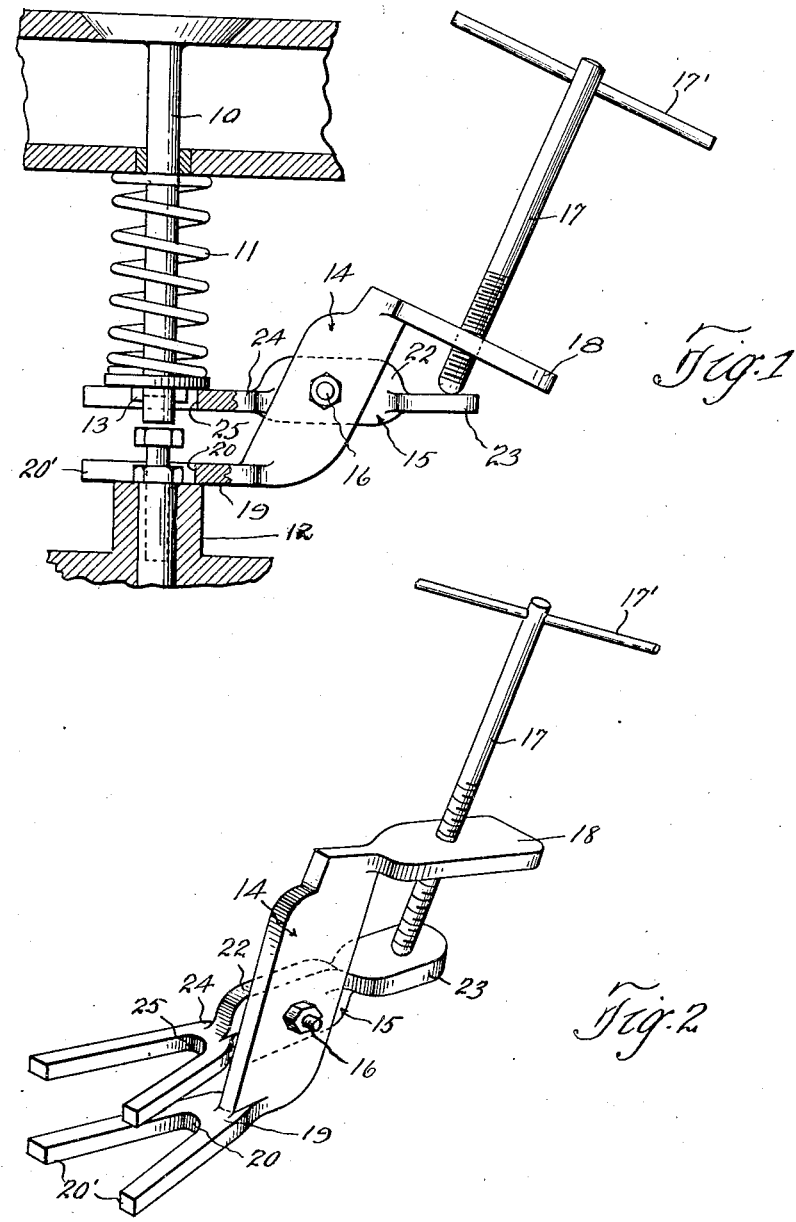
Fig. 1
Fig. 2
Inventor
J. G. Oestreich
By 
Attorneys

UNITED STATES PATENT OFFICE.

JOHN G. OESTREICH, OF PHILADELPHIA, PENNSYLVANIA.

VALVE-SPRING LIFTER.

1,358,871.

Specification of Letters Patent.  Patented Nov. 16, 1920.

Application filed May 1, 1920. Serial No. 378,126.

*To all whom it may concern:*

Be it known that I, JOHN G. OESTREICH, a citizen of the United States, residing at Philadelphia, in the county of Philadelphia, State of Pennsylvania, have invented certain new and useful Improvements in Valve-Spring Lifters; and I do hereby declare the following to be a full, clear, and exact description of the invention, such as will enable others skilled in the art to which it appertains to make and use the same.

This invention relates to new and useful improvements in tools for use in connection with an automobile or similar engine, and particularly to device for compressing the valve springs to permit the holding pins being easily removed.

One object of the invention is to provide a novel and improved device of this character whereby the spring can be easily and quickly compressed and the pin removed, without danger or exertion on the part of the operator.

Another object is to provide a novel and improved device of this character which is simple in construction, cheap of manufacture, and one whereby the tension of the spring, or the compression thereof, can be regulated to suit the conditions and desires of the operator.

Other objects and advantages will be apparent from the following description when taken in connection with the accompanying drawing.

In the drawing:

Figure 1 is a side elevation of the device in operative position with respect to the spring of a valve stem.

Fig. 2 is a perspective view of the device.

Referring particularly to the accompanying drawing, 10 represents the valve stem, 11 the coil spring therearound, 12. the lower guide for the stem, and 13 the pin, through the stem below the lower end of the spring, which holds the spring in proper position on the stem, in connection with which the present device is particularly adapted for use.

The device includes a pair of members 14 and 15, a pivot bolt 16, connecting them, and a tensioning and spreading screw stem or rod 17.

The member 14 has a central flat body portion from one end of which extends an arm 18, while a similar arm 19 extends from the opposite end, said arms being disposed to extend in opposite directions, as clearly seen in the drawing. The arm 18 is comparatively wide and flat, but arranged in a plane at right angles to the body. The arm 19 is also wide and flat, and disposed in a plane at right angles to the body, but in a plane slightly out of parallel with the plane of the arm 18. This latter arm is bifurcated as shown at 20, to provide a pair of legs 20' for straddling engagement with the valve stem 10 beneath the pin 13, and arranged to rest on the upper end of the lower guide 12. The other arm 18 is formed with a threaded opening for the reception of the threaded portion of the spreading rod 17.

The other member 15 comprises a flat vertical body 22, similar to the body of the member 14, and extending from opposite ends of this body, in the same plane with each other, and in a plane at right angles to the body, are the flat wide portions 23 and 24. On the upper face of the portion 23 the lower end of the rod 17 is arranged to bear, as shown in the drawing. The other member or portion 24 is bifurcated at 25 for straddling engagement with the valve stem 10, directly beneath, the lower end of the spring 11, the pin 13 disposing itself longitudinally of the bifurcation so that the member 15, when rocked upwardly, will force the spring upwardly under tension and at the same time readily pass the said pin. Thus the pressure of the spring, on the pin, is relieved, and the pin may then be easily withdrawn from the valve stem.

It will be noted that the portions 23 and 24, of the member 15 are slightly offset toward one side of the body, this being to permit the other member 14, and the tension or spreading rod to properly engage the portion 23, as well as to dispose the portions 24 and 18 in proper alinement for engagement with the stem of the valve, and with the spring and lower guide.

The upper end of the rod 17 is provided with a transverse bar 17' which is adapted to be grasped by the operator to facilitate the rotation of the rod.

It will be seen that when the bifurcated portions of the member 14 and 15 are properly engaged with the valve stem and with the lower end of the spring as well as the lower valve stem guide, pressure on the portion 24, when the rod is screwed down, will force the bifurcated portions of the members 14 and 15 apart to force up the spring and permit the pin 11 to be readily removed.

What is claimed is:

A valve spring lifter comprising a pair of members pivotally connected and each including a body member disposed in a vertical plane, portions extending from opposite ends of the bodies in planes at right angles to the said bodies, said portions of one member being in the same plane while said portions of the other body are in planes at an angle to each other, said portions at one end of the members being bifurcated and in vertical alinement, the other of the angularly extending portion being formed with a threaded opening, and a threaded rod engaged through the said opening and bearing on the adjacent portion of the other member.

In testimony whereof, I affix my signature in the presence of two witnesses.

JOHN G. OESTREICH.

Witnesses:
 THEODORE A. FEDERWITZ,
 OTTO C. KRUEGER.